United States Patent
Sambhar

(10) Patent No.: US 12,323,405 B2
(45) Date of Patent: Jun. 3, 2025

(54) METHOD AND SYSTEM FOR PROVIDING SMART CONTRACT CATALOGUE

(71) Applicant: JPMorgan Chase Bank, N.A., New York, NY (US)

(72) Inventor: Ankur Sambhar, Thane West (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 619 days.

(21) Appl. No.: 17/350,571

(22) Filed: Jun. 17, 2021

(65) Prior Publication Data

US 2022/0360574 A1  Nov. 10, 2022

(30) Foreign Application Priority Data

May 5, 2021 (IN) .............................. 202111020555

(51) Int. Cl.
| | |
|---|---|
| *G06F 21/00* | (2013.01) |
| *G06F 16/2455* | (2019.01) |
| *G06Q 10/10* | (2023.01) |
| *H04L 9/40* | (2022.01) |
| *G06Q 40/06* | (2012.01) |
| *G06Q 50/18* | (2012.01) |

(52) U.S. Cl.
CPC .......... *H04L 63/08* (2013.01); *G06F 16/2455* (2019.01); *G06Q 10/10* (2013.01); *G06Q 40/06* (2013.01); *G06Q 50/18* (2013.01)

(58) Field of Classification Search
None
See application file for complete search history.

(56) References Cited

U.S. PATENT DOCUMENTS

| | | | |
|---|---|---|---|
| 2015/0135272 A1* | 5/2015 | Shah | H04L 63/08 726/4 |
| 2016/0099924 A1* | 4/2016 | Mehta | H04L 61/4552 726/7 |
| 2017/0034152 A1* | 2/2017 | Subramanya | H04L 63/101 |
| 2017/0068943 A1* | 3/2017 | Narayana | G06Q 20/20 |

(Continued)

OTHER PUBLICATIONS

International Search Report and Written Opinion in corresponding International Application No. PCT/US2022/027655, dated Aug. 3, 2022.

*Primary Examiner* — Eleni A Shiferaw
*Assistant Examiner* — Hassan A Hussein
(74) *Attorney, Agent, or Firm* — GREENBLUM & BERNSTEIN, P.L.C.

(57) ABSTRACT

A method and a system for providing a catalogue of smart contracts deployed on a blockchain that is available to authenticated users is provided. The method includes: accessing each node of the blockchain; identifying all smart contracts that have been deployed within each respective node; indexing the identified smart contracts by assigning each respective smart contract to a corresponding category; generating a catalogue that includes an indexed listing each of the identified smart contracts; receiving a user request for access to the catalogue with an authorization credential; authenticating the user; and providing the requested catalogue access to the user. The method may also include receiving a search request; providing a list of smart contracts that corresponds to the criteria included in the search request; and monitoring the list for subsequent transactional activity.

12 Claims, 5 Drawing Sheets

(56) References Cited

U.S. PATENT DOCUMENTS

| | | | |
|---|---|---|---|
| 2018/0365686 A1* | 12/2018 | Kondo | H04L 9/3239 |
| 2019/0042620 A1* | 2/2019 | Garagiola | G06Q 20/3827 |
| 2019/0095631 A1* | 3/2019 | Roets | G06F 21/604 |
| 2019/0156938 A1* | 5/2019 | Brunner | G16H 10/60 |
| 2019/0164157 A1* | 5/2019 | Balaraman | G06Q 20/36 |
| 2019/0188399 A1* | 6/2019 | Palaniappan | H04L 9/0618 |
| 2019/0303541 A1* | 10/2019 | Reddy | G06F 21/64 |
| 2019/0332808 A1* | 10/2019 | Dunjic | G06F 21/6263 |
| 2020/0134585 A1* | 4/2020 | Xu | H04L 9/3236 |
| 2020/0159946 A1* | 5/2020 | Castinado | H04L 63/08 |
| 2020/0327112 A1* | 10/2020 | Glickshtein | H04L 69/22 |
| 2020/0327609 A1* | 10/2020 | Dubrofsky | G06Q 40/06 |
| 2020/0349194 A1* | 11/2020 | Kundu | G06F 21/64 |
| 2021/0027404 A1* | 1/2021 | de Bold | G06Q 50/18 |
| 2021/0097439 A1* | 4/2021 | Vodencarevic | G06F 18/214 |
| 2021/0174432 A1* | 6/2021 | Gonnaud | G06Q 20/401 |
| 2021/0297262 A1* | 9/2021 | Fang | G06Q 50/26 |
| 2022/0058282 A1* | 2/2022 | Ricotta, Jr. | G06Q 30/0185 |
| 2022/0101961 A1* | 3/2022 | Ballard | G06F 40/205 |
| 2022/0171763 A1* | 6/2022 | Garg | G06F 21/604 |
| 2022/0366494 A1* | 11/2022 | Cella | H04L 9/50 |

\* cited by examiner

METHOD AND SYSTEM FOR PROVIDING SMART CONTRACT CATALOGUE

CROSS-REFERENCE TO RELATED APPLICATIONS

This application claims priority benefit from Indian Application No. 202111020555, filed May 5, 2021, which is hereby incorporated by reference in its entirety.

BACKGROUND

Field of the Disclosure

This technology generally relates to methods and systems for providing a catalogue of smart contracts deployed on a blockchain that is available to authenticated users.

1. Background Information

In recent years, blockchain has become increasingly popular as a decentralized, distributed, and often public digital ledger consisting of records called blocks that is used to record transactions across many computers so that any involved block cannot be altered retroactively, without the alteration of all subsequent blocks.

There are many smart contracts that are being deployed in the public/private/protected blockchain. However, there is no single catalogue of deployed smart contracts that would facilitate an ability of an authenticated user to determine which smart contracts are available.

SUMMARY

The present disclosure, through one or more of its various aspects, embodiments, and/or specific features or sub-components, provides, inter alia, various systems, servers, devices, methods, media, programs, and platforms for providing a catalogue of smart contracts deployed on a blockchain that is available to authenticated users.

According to an aspect of the present disclosure, a method for providing a catalogue of smart contracts deployed on a blockchain that is available to authenticated users is provided. The method is implemented by at least one processor. The method includes: accessing, by the at least one processor, each of a plurality of nodes of the blockchain; identifying, by the at least one processor, all smart contracts that have been deployed within each respective node from among the plurality of nodes; indexing, by the at least one processor, the identified smart contracts by assigning each respective smart contract to a corresponding category from among a predetermined plurality of categories; and generating, by the at least one processor, a catalogue that includes an indexed listing each of the identified smart contracts based on a result of the indexing.

The method may further include: receiving, from a user, a request for access to the catalogue; transmitting, to the user, a request for a credential that indicates that the user is authorized to access the catalogue; and when a credential is received, authenticating the user and providing the requested catalogue access to the user.

The method may further include: receiving, from the authenticated user, a search request that includes at least one search criterion; determining, from among the identified smart contracts, a first list of smart contracts that satisfy the at least one search criterion; and transmitting, to the authenticated user, the first list of smart contracts.

The method may further include: monitoring each respective smart contract included in the first list of smart contracts to determine when a new transaction is executed; and when a determination is made that the new transaction has been executed with respect to a particular smart contract, notifying the authenticated user about the new transaction.

The method may further include: receiving, from the authenticated user, an updated search request that includes at least one from among a modification of the at least one search criterion and a newly added search criterion; determining, from among the identified smart contracts, a second list of smart contracts based on the updated search request; and transmitting, to the authenticated user, the second list of smart contracts.

The predetermined plurality of categories may include at least one from among a smart legal contract category, a decentralized autonomous organization (DAO) contract category, and an application logic contract category.

The method may further include periodically updating the catalogue by repeating the accessing of each of the plurality of nodes of the blockchain, the identifying of all deployed smart contracts, and the indexing of the identified smart contracts at a predetermined interval.

The predetermined interval may be equivalent to one week.

According to another exemplary embodiment, a computing apparatus for providing a catalogue of smart contracts deployed on a blockchain that is available to authenticated users is provided. The computing apparatus includes a processor; a memory; and a communication interface coupled to each of the processor and the memory. The processor is configured to: access each of a plurality of nodes of the blockchain; identify all smart contracts that have been deployed within each respective node from among the plurality of nodes; index the identified smart contracts by assigning each respective smart contract to a corresponding category from among a predetermined plurality of categories; and generate a catalogue that includes an indexed listing each of the identified smart contracts based on a result of the indexing.

The processor may be further configured to: receive, from a user via the communication interface, a request for access to the catalogue; transmit, to the user via the communication interface, a request for a credential that indicates that the user is authorized to access the catalogue; and when a credential is received, authenticate the user and provide the requested catalogue access to the user via the communication interface.

The processor may be further configured to: receive, from the authenticated user via the communication interface, a search request that includes at least one search criterion; determine, from among the identified smart contracts, a first list of smart contracts that satisfy the at least one search criterion; and transmit, to the authenticated user via the communication interface, the first list of smart contracts.

The processor may be further configured to: monitor each respective smart contract included in the first list of smart contracts to determine when a new transaction is executed; and when a determination is made that the new transaction has been executed with respect to a particular smart contract, notify the authenticated user about the new transaction via the communication interface.

The processor may be further configured to: receive, from the authenticated user via the communication interface, an updated search request that includes at least one from among a modification of the at least one search criterion and a newly added search criterion; determine, from among the identified smart contracts, a second list of smart contracts based on the updated search request; and transmit, to the authenticated user via the communication interface, the second list of smart contracts.

The predetermined plurality of categories may include at least one from among a smart legal contract category, a decentralized autonomous organization (DAO) contract category, and an application logic contract category.

The processor may be further configured to periodically update the catalogue by repeating the accessing of each of the plurality of nodes of the blockchain, the identifying of all deployed smart contracts, and the indexing of the identified smart contracts at a predetermined interval.

The predetermined interval may be equivalent to one week.

According to yet another exemplary embodiment, a non-transitory computer readable storage medium storing instructions for providing a catalogue of smart contracts deployed on a blockchain that is available to authenticated users is provided. The storage medium includes executable code which, when executed by a processor, causes the processor to: access each of a plurality of nodes of the blockchain; identify all smart contracts that have been deployed within each respective node from among the plurality of nodes; index the identified smart contracts by assigning each respective smart contract to a corresponding category from among a predetermined plurality of categories; and generate a catalogue that includes an indexed listing each of the identified smart contracts based on a result of the indexing.

The executable code may be further configured to cause the processor to receive, from a user, a request for access to the catalogue; transmit, to the user, a request for a credential that indicates that the user is authorized to access the catalogue; and when a credential is received, authenticate the user and provide the requested catalogue access to the user.

The executable code may be further configured to cause the processor to: receive, from the authenticated user, a search request that includes at least one search criterion; determine, from among the identified smart contracts, a first list of smart contracts that satisfy the at least one search criterion; and transmit, to the authenticated user, the first list of smart contracts.

The executable code may be further configured to cause the processor to: monitor each respective smart contract included in the first list of smart contracts to determine when a new transaction is executed; and when a determination is made that the new transaction has been executed with respect to a particular smart contract, notify the authenticated user about the new transaction.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
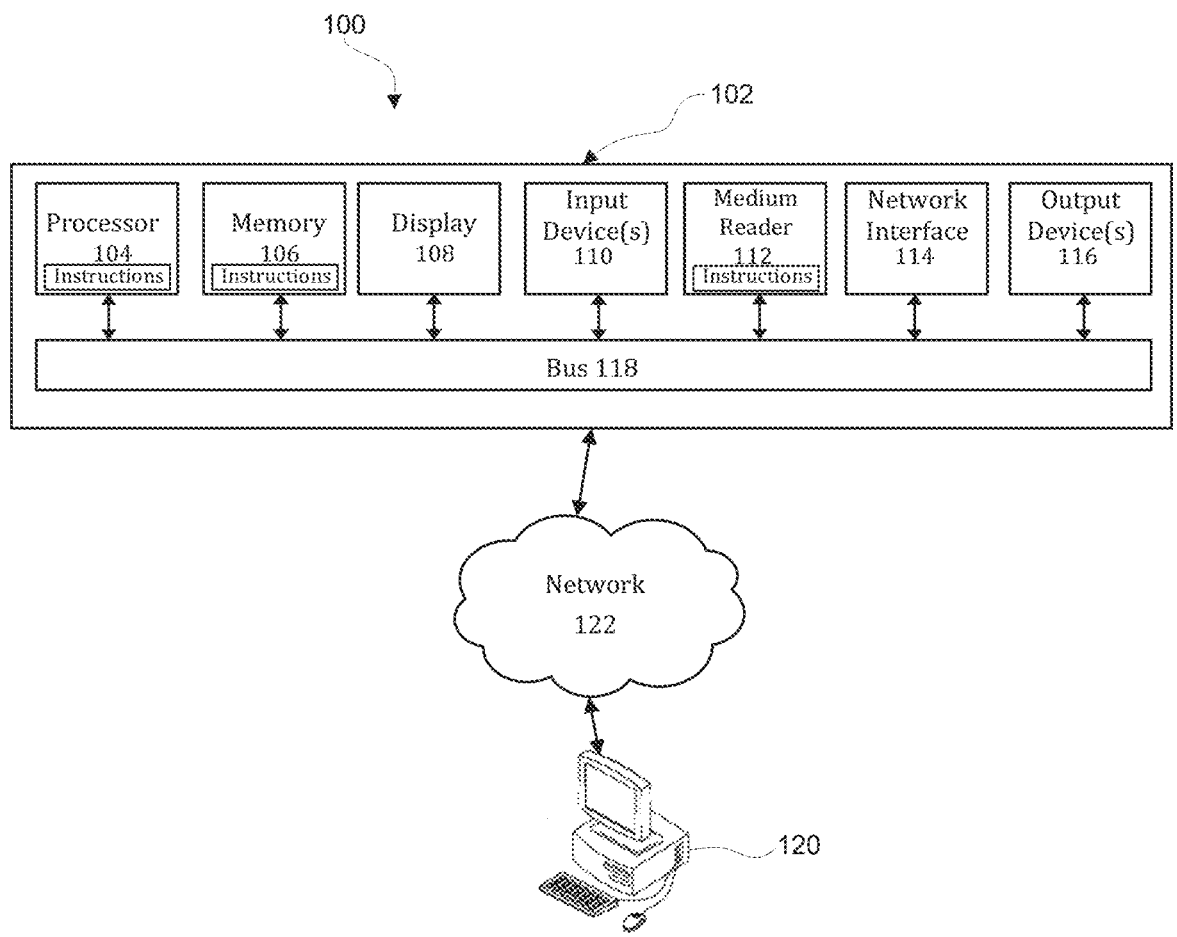
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, bluray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a catalogue of smart contracts deployed on a blockchain that is available to authenticated users.

Figure 2:
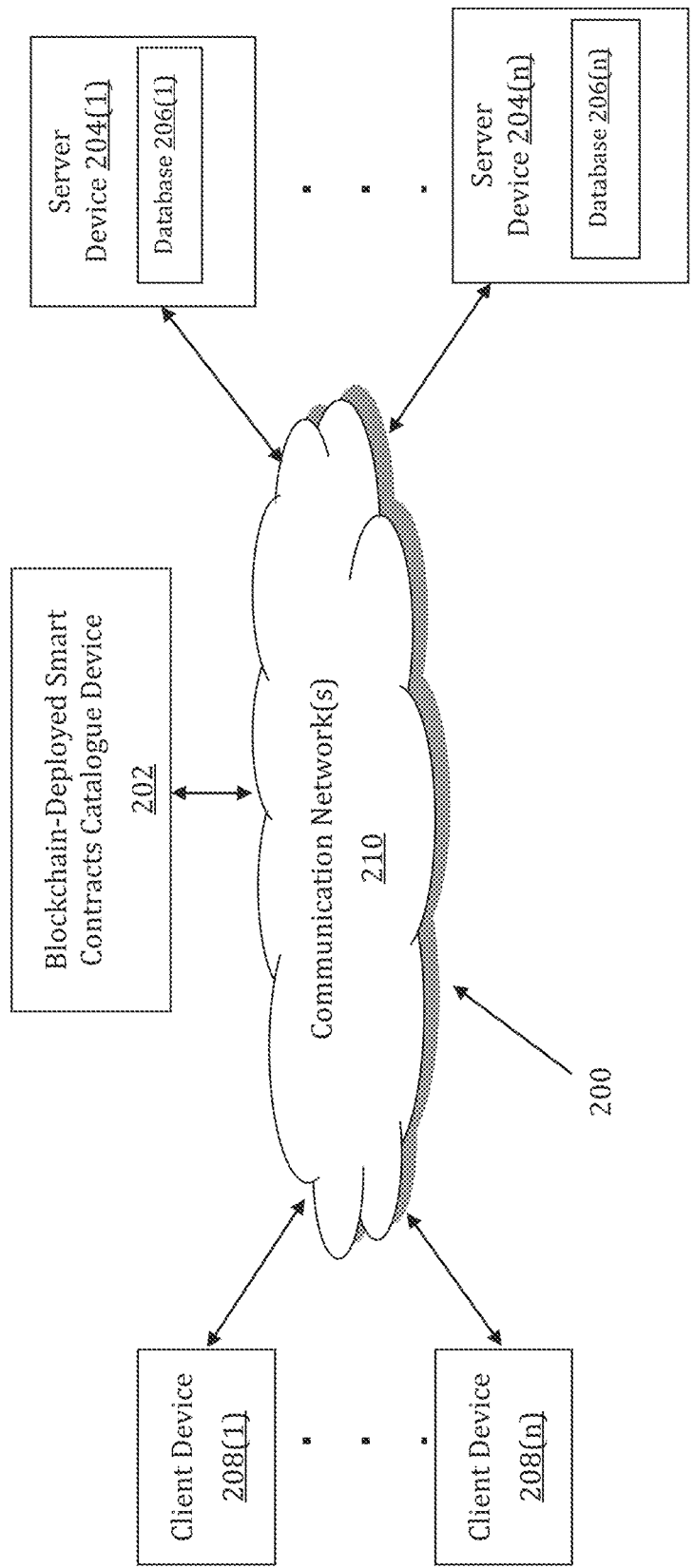
FIG. 2 illustrates an exemplary diagram of a network environment.

Referring to FIG. 2, a schematic of an exemplary network environment 200 for implementing a method for providing a catalogue of smart contracts deployed on a blockchain that is available to authenticated users is illustrated. In an exemplary embodiment, the method is executable on any networked computer platform, such as, for example, a personal computer (PC).

The method for providing a catalogue of smart contracts deployed on a blockchain that is available to authenticated users may be implemented by a Blockchain-Deployed Smart Contracts Catalogue (BDSCC) device 202. The BDSCC device 202 may be the same or similar to the computer system 102 as described with respect to FIG. 1. The BDSCC device 202 may store one or more applications that can include executable instructions that, when executed by the BDSCC device 202, cause the BDSCC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the BDSCC device 202 itself, may be located in virtual server(s) running in a cloud-based computing environment rather than being tied to one or more specific physical network computing devices. Also, the application(s) may be running in one or more virtual machines (VMs) executing on the BDSCC device 202. Additionally, in one or more embodiments of this technology, virtual machine(s) running on the BDSCC device 202 may be managed or supervised by a hypervisor.

In the network environment 200 of FIG. 2, the BDSCC device 202 is coupled to a plurality of server devices 204(1)-204(n) that hosts a plurality of databases 206(1)-206(n), and also to a plurality of client devices 208(1)-208(n) via communication network(s) 210. A communication interface of the BDSCC device 202, such as the network interface 114 of the computer system 102 of FIG. 1, operatively couples and communicates between the BDSCC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the BDSCC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and BDSCC devices that efficiently implement a method for providing a catalogue of smart contracts deployed on a blockchain that is available to authenticated users.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The BDSCC device 202 may be a standalone device or integrated with one or more other devices or apparatuses, such as one or more of the server devices 204(1)-204(n), for example. In one particular example, the BDSCC device 202 may include or be hosted by one of the server devices 204(1)-204(n), and other arrangements are also possible. Moreover, one or more of the devices of the BDSCC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the BDSCC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to smart contracts deployed on a blockchain and user-specific data that relates to search interest.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the BDSCC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the BDSCC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the BDSCC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the BDSCC device 202, the server devices 204(1)-204(n), or the client devices 208(1)-208(n), for example, may be configured to operate as virtual instances on the same physical machine. In other words, one or more of the BDSCC device 202, the server devices 204(1)-204(n), or the client devices 208(1)-208(n) may operate on the same physical device rather than as separate devices communicating through communication network(s) 210. Additionally, there may be more or fewer BDSCC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
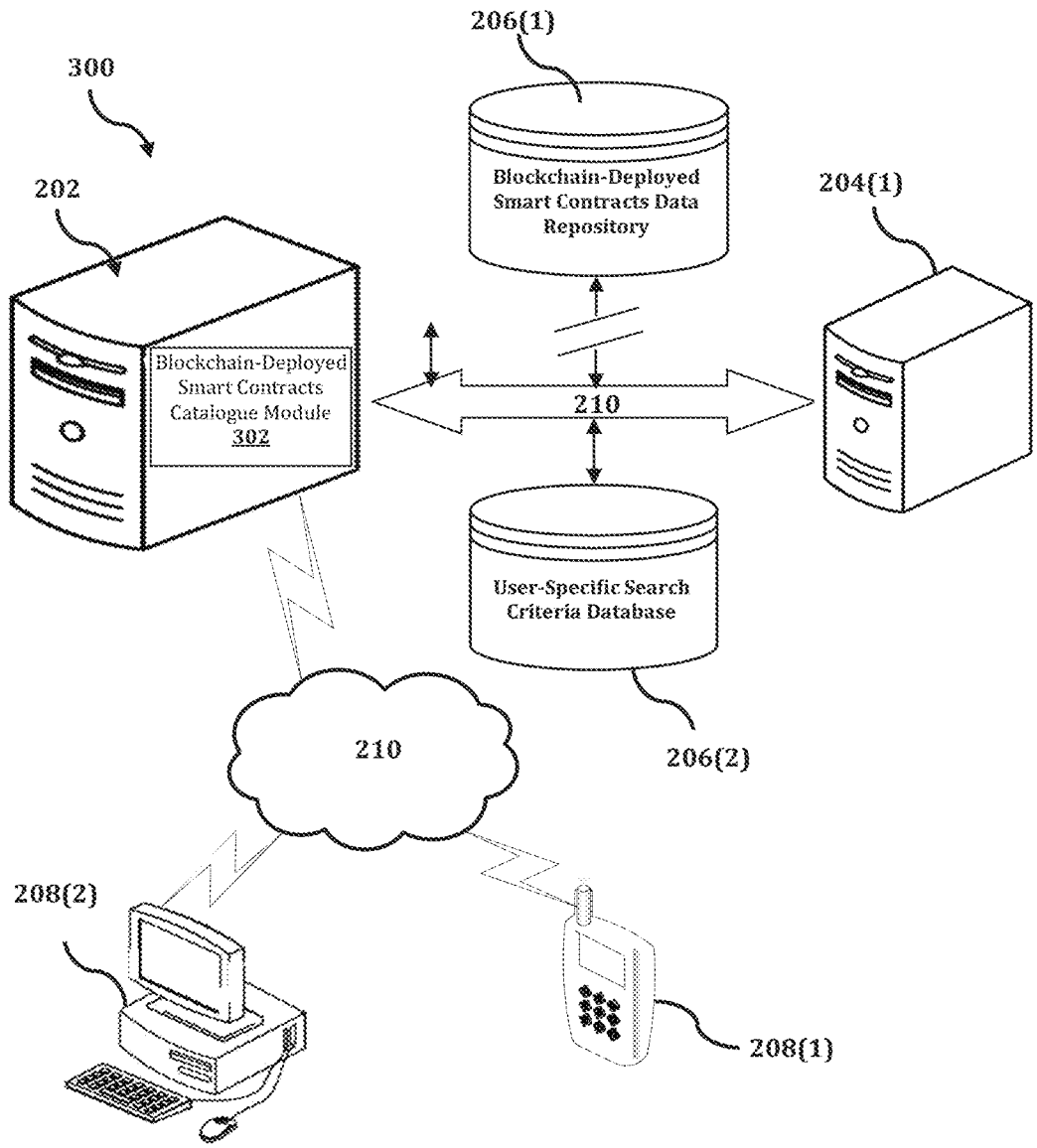
FIG. 3 shows an exemplary system for implementing a method for providing a catalogue of smart contracts deployed on a blockchain that is available to authenticated users.

The BDSCC device 202 is described and illustrated in FIG. 3 as including a blockchain-deployed smart contracts catalogue module 302, although it may include other rules, policies, modules, databases, or applications, for example. As will be described below, the blockchain-deployed smart contracts catalogue module 302 is configured to implement a method for providing a catalogue of smart contracts deployed on a blockchain that is available to authenticated users.

An exemplary process 300 for implementing a mechanism for providing a catalogue of smart contracts deployed on a blockchain that is available to authenticated users by utilizing the network environment of FIG. 2 is illustrated as being executed in FIG. 3. Specifically, a first client device 208(1) and a second client device 208(2) are illustrated as being in communication with BDSCC device 202. In this regard, the first client device 208(1) and the second client device 208(2) may be "clients" of the BDSCC device 202 and are described herein as such. Nevertheless, it is to be known and understood that the first client device 208(1) and/or the second client device 208(2) need not necessarily be "clients" of the BDSCC device 202, or any entity described in association therewith herein. Any additional or alternative relationship may exist between either or both of the first client device 208(1) and the second client device 208(2) and the BDSCC device 202, or no relationship may exist.

Further, BDSCC device 202 is illustrated as being able to access a blockchain-deployed smart contracts data repository 206(1) and a user-specific search criteria database 206(2). The blockchain-deployed smart contracts catalogue module 302 may be configured to access these databases for implementing a method for providing a catalogue of smart contracts deployed on a blockchain that is available to authenticated users.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the BDSCC device 202 via broadband or cellular communication. Of course, these embodiments are merely exemplary and are not limiting or exhaustive.

Upon being started, the blockchain-deployed smart contracts catalogue module 302 executes a process for providing a catalogue of smart contracts deployed on a blockchain that is available to authenticated users. An exemplary process for providing a catalogue of smart contracts deployed on a blockchain that is available to authenticated users is generally indicated at flowchart 400 in FIG. 4.

Figure 4:
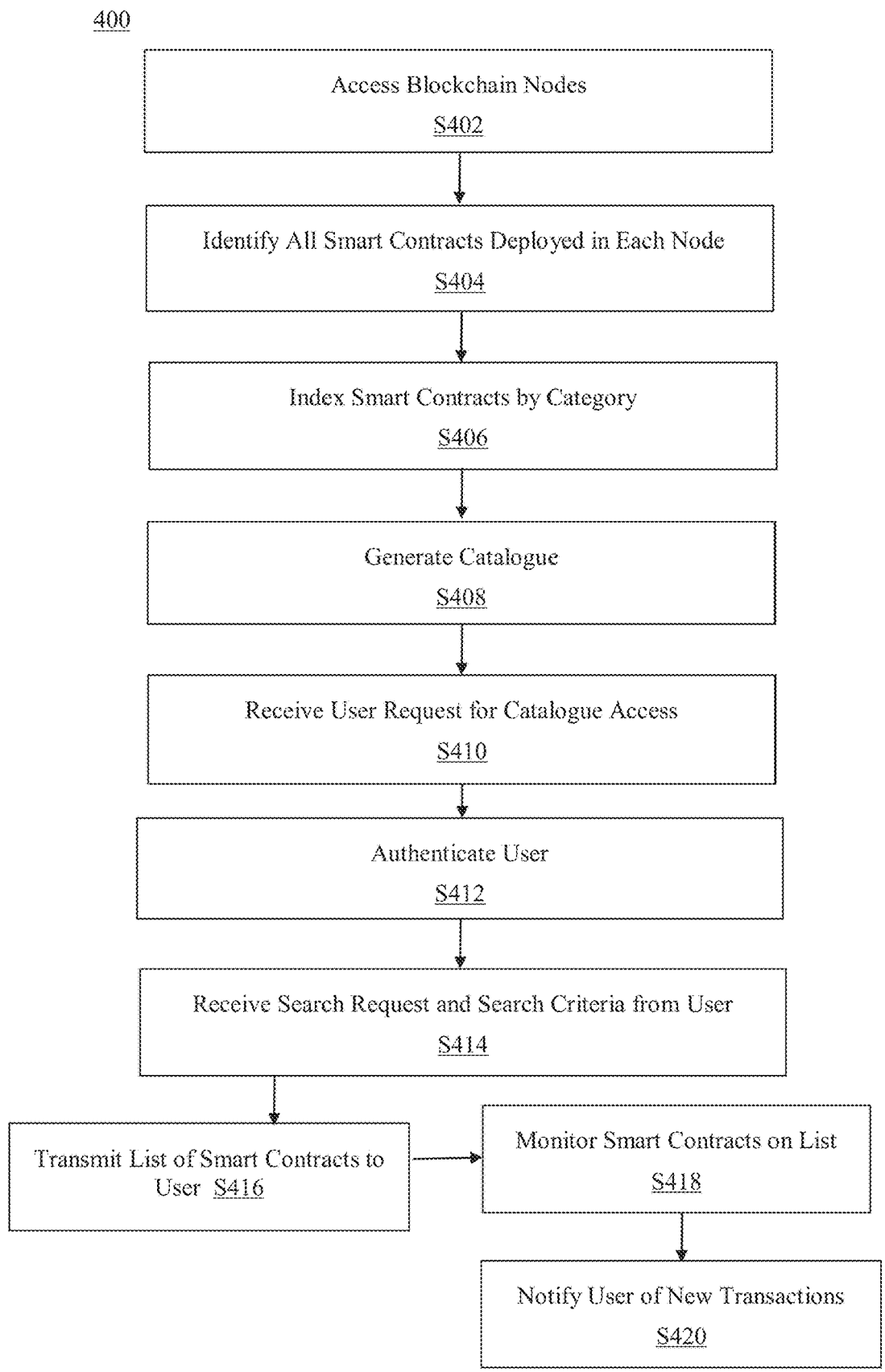
FIG. 4 is a flowchart of an exemplary process for implementing a method for providing a catalogue of smart contracts deployed on a blockchain that is available to authenticated users.

In process 400 of FIG. 4, at step S402, the blockchain-deployed smart contracts catalogue module 302 accesses a blockchain, and then at step S404, the blockchain-deployed smart contracts catalogue module 302 identifies all smart contracts that have been deployed on each node of the blockchain. In an exemplary embodiment, the blockchain-deployed smart contracts catalogue module 302 may be understood as crawling through each node of the blockchain in order to identify the deployed smart contracts. The blockchain may be any of a public blockchain, a private blockchain, a protected blockchain, a permissioned blockchain, and/or any combination thereof.

At step S406, the blockchain-deployed smart contracts catalogue module 302 indexes the smart contracts identified in step S404 by assigning each smart contract to a category. In an exemplary embodiment, there is a predetermined list of categories, which may include any one or more of a smart legal contract category, a decentralized autonomous organization (DAO) contract category, and an application logic contract category. Then, at step S408, the blockchain-deployed smart contracts catalogue module 302 generates a catalogue based on the indexed and categorized list of smart contracts obtained as a result of step S406.

At step S410, the blockchain-deployed smart contracts catalogue module 302 receives a request from a user to access the catalogue. When a user request is received, then, at step S412, the blockchain-deployed smart contracts catalogue module 302 attempts to authenticate the user by requesting a credential that indicates that the user is authorized to access the catalogue. When an acceptable credential is received, the user is authenticated, and access to the catalogue is provided to the user.

At step S414, the blockchain-deployed smart contracts catalogue module 302 receives a search request that includes one or more search criteria from an authenticated user. Then, the blockchain-deployed smart contracts catalogue module 302 searches the catalogue and retrieves smart contracts that satisfy the search criteria, and at step S416, a list of such smart contracts is transmitted to the user.

At step S418, the blockchain-deployed smart contracts catalogue module 302 monitors the smart contracts on the list in order to determine when new transactions are executed with respect to any such smart contract. At step S420, when a determination is made that a new transaction has been executed, the blockchain-deployed smart contracts catalogue module 302 notifies the user that had submitted the search request in order to generate the list of smart contracts.

In an exemplary embodiment, the blockchain-deployed smart contracts catalogue module 302 may receive updated search criteria from an authenticated user at any time, i.e., a repeat of step S414. In this circumstance, the blockchain-deployed smart contracts catalogue module 302 repeats steps S416, S418, and S420 in order to provide an updated list of smart contracts and updated information regarding newly executed transactions.

In an exemplary embodiment, the blockchain-deployed smart contracts catalogue module 302 may periodically update the catalogue by crawling through each node of the blockchain, identifying all smart contracts that have been deployed thereon, and indexing the identified smart contracts. The periodicity of such updates may be selected by an interested user as being a convenient time interval, such as, for example, once every 6 hours, once every 12 hours, once every day, once every week, or once every month.

In an exemplary embodiment, a system for providing a catalogue of smart contracts deployed on a blockchain that is available to authenticated users will crawl all the smart contracts deployed and mark them against various categories. The system will return the smart contracts based on a user search interest list and then can watch those smart contracts for new transactions.

Blockchain is expected to have a very large number of smart contracts deployed. In view of the way that various web pages are deployed on the world wide web, very similarly smart contracts serving different use-cases will be deployed on Blockchain.

In an exemplary embodiment, a crawler will crawl through all the nodes of the Blockchain and will index the deployed smart contracts. The crawler will allow the users to do a search on smart contracts. The crawler will perform the search on the index created through crawling. Based on the search criteria, the crawler will return the smart contracts or would allow the user to watch these smart contracts for new transactions. Due to transparency on the blockchain, all of the smart contracts will be visible to the crawler.

Figure 5:
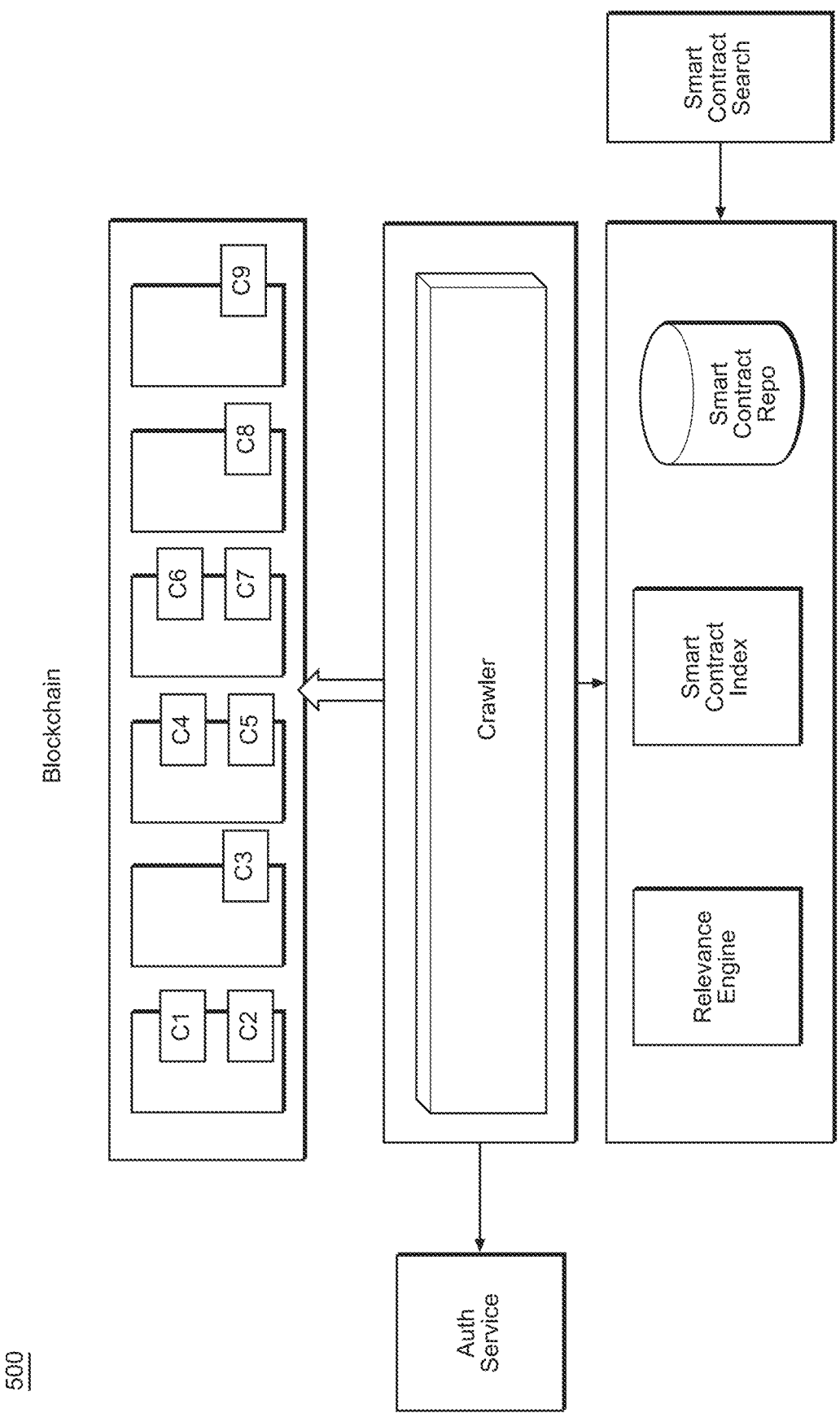
FIG. 5 is a block diagram that illustrates a flow of data through a system for providing a catalogue of smart contracts deployed on a blockchain that is available to authenticated users, according to an exemplary embodiment.

FIG. 5 is a block diagram 500 that illustrates a flow of data through a system for providing a catalogue of smart contracts deployed on a blockchain that is available to authenticated users, according to an exemplary embodiment.

As shown in FIG. 5, the system includes the following components: 1) Crawler crawls through various nodes of a given blockchain and identifies available smart contracts for indexing. Crawler may also crawl through all available public, protected or permissioned blockchains. For the permissioned and the private blockchains, Crawler will use the required authentication mechanism. 2) Authentication Service ("Auth Service"): Responsible for authenticating and authorizing the access request to the catalog of smart contracts with their metadata. 3) Smart Contract Repository will store the details of all the smart contracts collected by the crawler which will be accessed by the Smart Contract Search Engine. 4) Smart Contract Index: Maintains an index of all the smart contracts available in the repository based on various popularity and relevance algorithms. 5) Relevance Engine: Responsible for finding relevant results for the given request by searching the Smart Contract Repository leveraging Index. 6) Search Engine: Allows the applications or users to search smart contracts based on the specified criteria.

Accordingly, with this technology, an optimized process for providing a catalogue of smart contracts deployed on a blockchain that is available to authenticated users is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for providing a catalogue of smart contracts deployed on a blockchain that is available to authenticated users, the method being implemented by at least one processor, the method comprising:

accessing, by the at least one processor, each of a plurality of nodes of the blockchain;

identifying, by the at least one processor, all smart contracts that have been deployed within each respective node from among the plurality of nodes by crawling through each respective node and using a transparency of the blockchain to ensure that all deployed smart contracts are identified;

indexing, by the at least one processor, the identified smart contracts by assigning each respective smart contract to a corresponding category from among a predetermined plurality of categories;

generating, by the at least one processor, a catalogue that includes an indexed listing each of the identified smart contracts based on a result of the indexing;

receiving, from a user, a request for access to the catalogue;

transmitting, to the user in response to the request for access to the catalogue, a request for a credential that indicates that the user is authorized to access the catalogue;

when the credential is received, authenticating the user and providing the requested catalogue access to the user; and periodically updating the catalogue by repeating, at a predetermined interval, each of the accessing of each of the plurality of nodes of the blockchain, the identifying of all deployed smart contracts, and the indexing of the identified smart contracts, wherein the predetermined interval includes one from among once every six hours, once every twelve hours, once every day, once every week, and once every month; and wherein the method further comprises:

receiving, from the authenticated user, a search request that includes at least one search criterion;

determining, from among the identified smart contracts, a first list of smart contracts that satisfy the at least one search criterion; and transmitting, to the authenticated user, the first list of smart contracts.

2. The method of claim 1, further comprising:
monitoring each respective smart contract included in the first list of smart contracts to determine when a new transaction is executed; and
when a determination is made that the new transaction has been executed with respect to a particular smart contract, notifying the authenticated user about the new transaction.

3. The method of claim 1, further comprising:
receiving, from the authenticated user, an updated search request that includes at least one from among a modification of the at least one search criterion and a newly added search criterion;
determining, from among the identified smart contracts, a second list of smart contracts based on the updated search request; and
transmitting, to the authenticated user, the second list of smart contracts.

4. The method of claim 1, wherein the predetermined plurality of categories includes an application logic contract category.

5. The method of claim 1, wherein the predetermined interval is equivalent to one week.

6. A computing apparatus for providing a catalogue of smart contracts deployed on a blockchain that is available to authenticated users, the computing apparatus comprising:
a processor;
a memory; and
a communication interface coupled to each of the processor and the memory,
wherein the processor is configured to:
access each of a plurality of nodes of the blockchain;
identify all smart contracts that have been deployed within each respective node from among the plurality of nodes by crawling through each respective node and using a transparency of the blockchain to ensure that all deployed smart contracts are identified;
index the identified smart contracts by assigning each respective smart contract to a corresponding category from among a predetermined plurality of categories;
generate a catalogue that includes an indexed listing each of the identified smart contracts based on a result of the indexing;
receive, from a user via the communication interface, a request for access to the catalogue;
transmit, to the user in response to the request for access to the catalogue via the communication interface, a request for a credential that indicates that the user is authorized to access the catalogue;
when the credential is received, authenticate the user and provide the requested catalogue access to the user via the communication interface; and periodically update the catalogue by repeating, at a predetermined interval, each of the accessing of each of the plurality of nodes of the blockchain, the identifying of all deployed smart contracts, and the indexing of the identified smart contracts at a predetermined interval, wherein the predetermined interval includes one from among once every six hours, once every twelve hours, once every day, once every week, and once every month; and wherein the processor is further configured to:
receive, from the authenticated user via the communication interface, a search request that includes at least one search criterion;
determine, from among the identified smart contracts, a first list of smart contracts that satisfy the at least one search criterion; and
transmit, to the authenticated user via the communication interface, the first list of smart contracts.

7. The computing apparatus of claim 6, wherein the processor is further configured to:
monitor each respective smart contract included in the first list of smart contracts to determine when a new transaction is executed; and
when a determination is made that the new transaction has been executed with respect to a particular smart contract, notify the authenticated user about the new transaction via the communication interface.

8. The computing apparatus of claim 6, wherein the processor is further configured to:
receive, from the authenticated user via the communication interface, an updated search request that includes at least one from among a modification of the at least one search criterion and a newly added search criterion;
determine, from among the identified smart contracts, a second list of smart contracts based on the updated search request; and
transmit, to the authenticated user via the communication interface, the second list of smart contracts.

9. The computing apparatus of claim 6, wherein the predetermined plurality of categories includes an application logic contract category.

10. The computing apparatus of claim 6, wherein the predetermined interval is equivalent to one week.

11. A non-transitory computer readable storage medium storing instructions for providing a catalogue of smart contracts deployed on a blockchain that is available to authenticated users, the storage medium comprising executable code which, when executed by a processor, causes the processor to:
access each of a plurality of nodes of the blockchain;
identify all smart contracts that have been deployed within each respective node from among the plurality of nodes by crawling through each respective node and using a transparency of the blockchain to ensure that all deployed smart contracts are identified;
index the identified smart contracts by assigning each respective smart contract to a corresponding category from among a predetermined plurality of categories;
generate a catalogue that includes an indexed listing each of the identified smart contracts based on a result of the indexing;
receive, from a user, a request for access to the catalogue;
transmit, to the user in response to the request for access to the catalogue, a request for a credential that indicates that the user is authorized to access the catalogue;

when the credential is received, authenticate the user and provide the requested catalogue access to the user; and periodically update the catalogue by repeating, at a predetermined interval, each of the accessing of each of the plurality of nodes of the blockchain, the identifying of all deployed smart contracts, and the indexing of the identified smart contracts, wherein the predetermined interval includes one from among once every six hours, once every twelve hours, once every day, once every week, and once every month; and wherein the executable code is further configured to cause the processor to:

receive, from the authenticated user, a search request that includes at least one search criterion;

determine, from among the identified smart contracts, a first list of smart contracts that satisfy the at least one search criterion; and transmit, to the authenticated user, the first list of smart contracts.

12. The storage medium of claim 11, wherein the executable code is further configured to cause the processor to:

monitor each respective smart contract included in the first list of smart contracts to determine when a new transaction is executed; and when a determination is made that the new transaction has been executed with respect to a particular smart contract, notify the authenticated user about the new transaction.

* * * * *